Aug. 9, 1927.
T. W. CASE
1,638,472
TRANSLATING DEVICE
Filed July 24, 1924
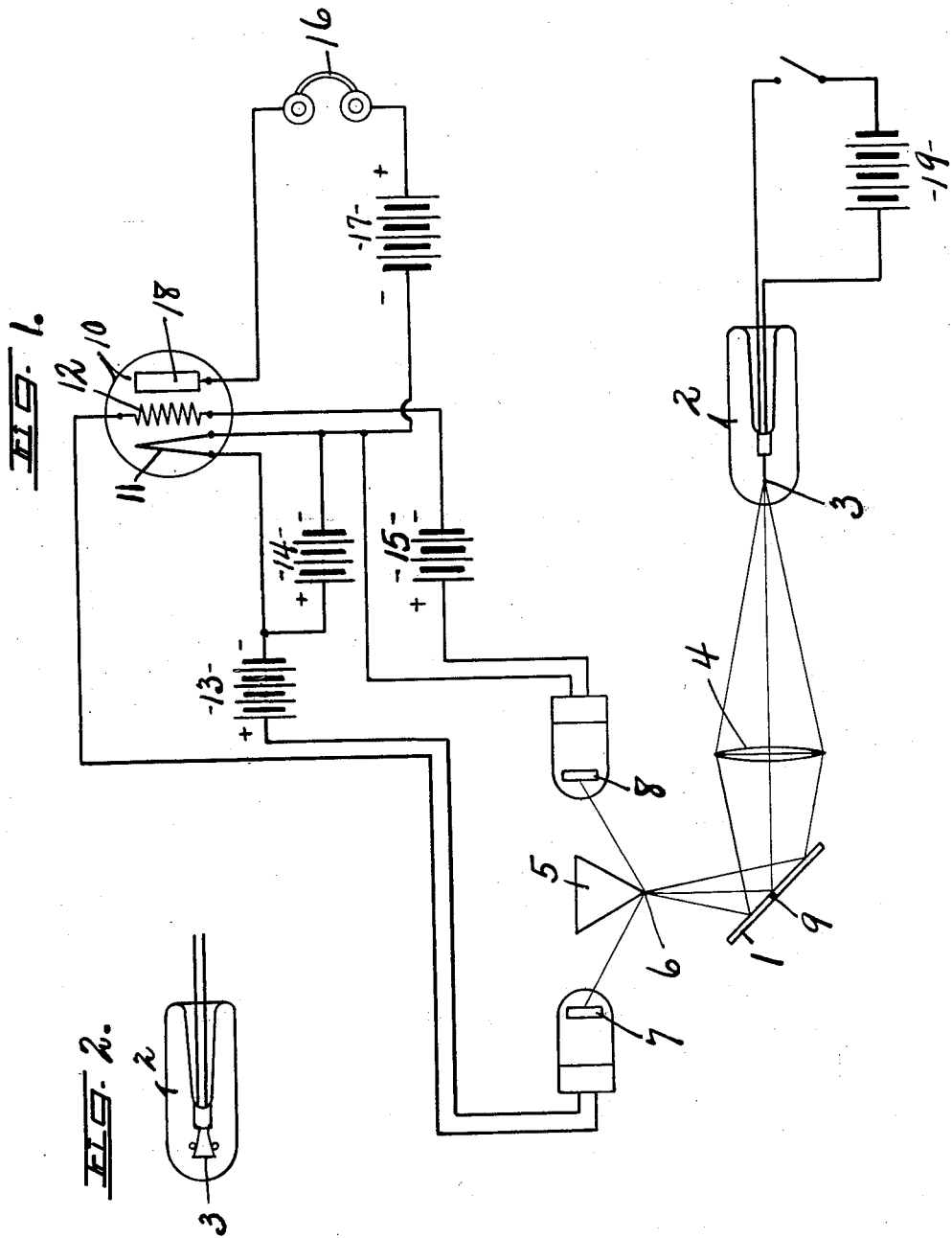

Patented Aug. 9, 1927.

1,638,472

UNITED STATES PATENT OFFICE.

THEODORE WILLARD CASE, OF AUBURN, NEW YORK, ASSIGNOR TO CASE RESEARCH LABORATORY, INC., OF AUBURN, NEW YORK, A CORPORATION OF NEW YORK.

TRANSLATING DEVICE.

Application filed July 24, 1924. Serial No. 727,949.

This invention relates to a certain new and improved translating device.

The main object of the invention is the production of an apparatus for receiving, amplifying and translating frequencies as determined by the movement of a mirror or reflector, as for instance, the mirror of a mirror-galvanometer, and the apparatus is capable of many adaptations and uses, as for instance in cable reception, or any place where a mirror is moved in accordance with pre-determined frequencies.

Other objects and advantages relate to the details of the structure and the arrangement and association of the parts thereof, all as will more fully appear from the following description, taken in connection with the accompanying drawings, in which:

Figure 1 is a diagrammatic illustration of an embodiment of my invention.

Figure 2 is a further illustration of a lamp suitable for use in connection with my invention.

The apparatus, as shown, comprises a mirror —1— as suggested above, the mirror for instance, of a galvanometer, in combination with a suitable source of a line of light, as for instance the electric lamp —2— having a straight-line filament —3— as best shown in Figure 2, and the filament may be of any desired diameter or width and length.

The light rays emanating from the line filament —3— of the lamp —2— are concentrated on the mirror —1—, as for instance, by a double convex lens —4— under the condition that the lens is so arranged with respect to the lamp and the mirror and the mirror is so positioned and arranged with respect to a triangular prism —5— that the image of the filament —3— is focused lengthwise of and upon one edge —6— of the prism when the mirror is in its normal position of rest, under which circumstances, the light striking the edge of the prism is reflected or refracted by the prism equally upon both the light reactive cells —7— and —8— suitably arranged with respect to the prism for effecting that result. As the mirror swings, for instance about a central vertical axis indicated by the point —9—, more of the light is reflected upon one of the light reactive cells than upon the other, and the light reactive cells are so connected in circuit with a space discharge device —10— as to effect a materially increased or double amplification of the variations in current flowing in the circuits, as a result of variations in the electrical resistance of the light reactive cells —7— and —8— when subjected to light reflected or refracted from the prism —5—.

These light reactive cells may be of any well known form and shape, and of any suitable material, as for instance selenium, which varies its resistance to the passage of an electric current in accordance with the intensity of the light rays to which the substance is subjected. As illustrated, the light cells —7— and —8— are disposed upon opposite sides of the prism —5— and the cell —7— is connected in circuit with the filament —11— and the grid —12— of the space discharge device —10—. A source of potential as the battery —13— is included in such circuit, with its negative side connected to the filament —11— and its positive side connected to the grid —12—. The filament —11— may be lighted in any suitable way, as by circuit including source of potential —14—. The light cell —8— is likewise connected in circuit across the filament —11— and grid —12—, such circuit including a source of potential as the battery —15— having its negative side connected to the grid —12— and its positive side connected to the filament —11— for the purpose of effecting the operation as hereinafter described.

It will be apparent that as the mirror —9— swings about a vertical axis, the image of the filament —3— which at normal position of the mirror is focused upon the edge of the prism, —5—, will move either partially or wholly to one side of the edge —6— of the prism —5— whereby a greater portion of the light is reflected or refracted by the prism —5— upon one of the light cells than upon the other. For illustrative purposes, assume that a swinging movement of the mirror causes more of the focused image of the filament —3— as reflected by the prism —5— to strike the light cell —7— and a lesser portion to strike the light cell —8— than under normal condition of the apparatus.

Under such condition more current will flow in the circuit including the light cell —7— because the increase in intensity of light striking the light cell —7— will reduce its resistance to the passage of current through the circuit whereupon the grid —12— will become more positive.

In view of the fact that less light than under the normal condition strikes the light cell —8—, its resistance to the passage of current will be increased, and less current will flow in the circuit including the light cell —8— and as a result of this condition, the grid —12— will become less negative so that the two circuits under such condition cooperate to produce a substantially increased positive potential on the grid, thereby substantially doubling the amplification effected by the structure which includes a suitable device for translating the resultant frequencies into signals, preferably audible signals, as by the use of telephone receivers —16— connected in circuit with a source of potential —17— across the filament —11— and plate —18— of the space-discharge device —10—.

A swinging movement of the mirror to the other side of its normal position is likewise accompanied by a duplicate amplification as a result of the fact that more light rays will then fall upon the cell —8— and less upon the cell —7—, whereupon the increased current flowing in the circuit, including the cell —8— will cause the grid to become more negative and the reduced current flowing in the circuit including the light cell —7— will cause the grid to become less positive, thereby again effecting doubled amplification.

The straight line filament —3— may be supported in any suitable manner, as for instance by the spring members shown, and may be heated in any suitable manner, as by an electric current flowing in a circuit including a source of potential as the battery —19—.

This device may also be used as an automatic relay where the incoming signals applied to the mirror may be amplified and automatically relayed.

As before stated, the mirror —1— may be a portion of any apparatus, as for instance, a galvanometer, in which the mirrow moves in accordance with variations in an electric current, preferably at pre-determined frequencies which can be rendered audible by means of telephone receivers or other suitable devices, and altho I have shown and described a diagrammatic illustration constituting an embodiment of my invention, I do not desire to restrict myself to the details of the structure or the arrangement of the parts thereof, or to any special application of the invention, as various changes, modifications and adaptations may be made within the scope of the appended claims.

I claim:

1. In an apparatus of the class described, a source of light, a mirror for reflecting rays from said source, a prism in the path of said reflecting rays, means for receiving and translating rays reflected by the prism into signals including two light reactive cells, a space discharge device, and a translating device.

2. In an apparatus of the class described, a source of light, a mirror for reflecting rays from said source, a prism in the path of said reflected rays, a pair of light cells disposed upon opposite sides of said prism, a space discharge device having two separate in-put circuits with one of said light cells in each circuit, and a separate source of potential in each of said in-put circuits.

3. In an apparatus of the class described, a source of light, a mirror for reflecting rays from said source, a prism in the path of said reflected rays, a pair of light cells disposed upon opposite sides of said prism, a space discharge device having two separate in-put circuits with one of said light cells in each circuit, a separate source of potential in each of said in-put circuits, said sources of potential being connected across the filament and grid of such space discharge device with opposite polarity.

4. In an apparatus of the class described, a source of a line of light, a mirror, a triangular prism for reflecting rays from said source, means for concentrating rays emanating from said source upon said mirror so that when reflected by the mirror the line of light is focused upon and lengthwise of one edge of the triangular prism, a pair of light cells disposed upon opposite sides of the edge of said prism upon which the line of light is focused, a space discharge device including a filament adapted to be heated, a grid and a plate, each of said light cells being connected in a separate in-put circuit for said space discharge-device, and across the filament and grid thereof, a source of potential in one of said in-put circuits having its negative pole connected to the filament and its positive pole connected to the grid, a source of potential in the other of said in-put circuits and having its negative pole connected to the grid and its positive pole connected to the filament, and an output circuit for said space discharge device connected across the filament and plate thereof and including a source of potential and a translating device.

5. In an apparatus of the class described, a lamp including a straight-line filament constituting a source of a line of light, a triangular prism, means for focusing said line of light upon one edge of said prism including a lens and a mirror, and a receiving apparatus including a light reactive cell, a space discharge device and a translating device.

6. In an apparatus of the class described, a source of a line of light, a triangular prism, a mirror for reflecting rays emanating from said source upon the triangular prism, and a receiving apparatus including a light reactive cell and a translating device.

7. In an apparatus of the class described, a source of a line of light, a triangular prism, a mirror for reflecting rays emanating from said source upon the triangular prism, a receiving apparatus including a light reactive cell, an amplifier and a translating device.

8. In an apparatus of the class described, a source of light, a mirror for reflecting rays from said source, a pair of light reactive cells and means for receiving a beam of light from said mirror and dividing the same into a plurality of beams adapted to strike the respective cells.

9. In an apparatus of the class described, a source of light, a mirror for reflecting rays from said source, a pair of light reactive cells and means for receiving a beam of light from said mirror and dividing the same into plurality of beams adapted to strike the respective cells, the relative size of the respective portions of the reflected beam striking said cells depending upon the position of the mirror.

10. In an apparatus of the class described, a source of light, a mirror for reflecting rays from said source, a pair of light reactive cells, a member having an edge portion upon which the reflected rays from said source are focused, a pair of light reactive cells disposed upon opposite sides of said member and each adapted to receive a portion of said focused rays as reflected by said member, such portions varying in accordance with movement of said mirror.

11. In an apparatus of the class described, a source of light, a member for reflecting rays from said source, a pair of light reactive cells, and means for receiving a beam of light from said reflecting member and dividing the same into a plurality of beams adapted to strike the respective cells, the relative size of the respective portions of the beam striking said cells depending upon the position of the mirror.

12. In an apparatus of the class described, a source of light, a mirror for reflecting rays from said source, a pair of light reactive cells, means for receiving a beam of light from said mirror and dividing the same into a plurality of beams adapted to strike the respective cells, a space discharge device having two in-put circuits connected to the respective light reactive cells with opposite polarity, and an out-put circuit containing a translating device.

13. In an apparatus of the class described, a source of light, a mirror for reflecting rays from said source, a pair of light reactive cells and means for receiving a beam of light from said mirror and dividing the same into a plurality of beams adapted to strike the respective cells the relative size of the respective portions of the reflected beam striking said cells depending upon the position of the mirror, a space discharge device having two in-put circuits connected to the respective light reactive cells with opposite polarity and an out-put circuit containing a translating device.

14. In an apparatus of the class described, a source of light, a mirror for reflecting rays from said source, a pair of light reactive cells, a member having an edge portion upon which the reflected rays from said source are focused, a pair of light reactive cells disposed upon opposite sides of said member and each adapted to receive a portion of said focused rays as reflected by said member, such portions varying in accordance with movement of said mirror, a space discharge device having two in-put circuits connected to the respective light reactive cells with opposite polarity, and an out-put circuit containing a translating device.

15. In an apparatus of the class described, a source of light, a member for reflecting rays from said source, a pair of light reactive cells, means for receiving a beam of light from said reflecting member and dividing the same into a plurality of beams adapted to strike the respective cells, the relative size of the respective portions of the beam striking said cells depending upon the position of the mirror, a space discharge device having two in-put circuits connected to the respective light reactive cells with opposite polarity, and an out-put circuit containing a translating device.

16. In an apparatus of the class described, a source of light rays, a triangular prism, means for focussing light rays from said source upon one edge of said prism, a pair of light reactive cells and a space discharge connected to said light reactive cells.

In witness whereof I have hereunto set my hand this 14th day of July, 1924.

THEODORE WILLARD CASE.